Jan. 2, 1968  R. FARNSWORTH  3,361,167
CHIPPER APPARATUS AND GUIDE THEREFOR
Filed Feb. 7, 1966  4 Sheets-Sheet 4

INVENTOR
RICHARD FARNSWORTH
BY
ATTYS.

United States Patent Office 3,361,167
Patented Jan. 2, 1968

3,361,167
CHIPPER APPARATUS AND GUIDE THEREFOR
Richard Farnsworth, Portland, Oreg., assignor to George M. Standal, Chemainus, British Columbia, Canada
Filed Feb. 7, 1966, Ser. No. 525,431
8 Claims. (Cl. 144—162)

This invention relates to a novel chipping apparatus, including a guide mechanism designed particularly for use with the chipping device.

The guide unit disclosed below is designed for use with the basic chipper disclosed in U.S. Patent 3,190,326, granted to G. M. Standal on June 22, 1965. The unit disclosed herein uses the same basic chipper structure, including bent chipper knives, but provides improved guidance of the planed surfaces during contact therewith by the cutting heads and exit of lumber from the apparatus. This guidance between the cutting heads is extremely important in a chipping device of this type which planes opposite sides of lumber simultaneously. Misalignment of the finished surfaces during the cutting operation produces rough and uneven surfaces in the final product.

It is a first object of this invention to provide an accurate guide mechanism for the cut surfaces located between rotary planing heads so as to at all times insure that the boards guided thereby will travel in a straight longitudinal line through the chipping apparatus.

Another object of this invention is to provide a mechanically simple guide arrangement requiring little upkeep or adjustment, the only adjustment required being that necessary to accommodate the entire apparatus to differing cutting widths.

Another object of this invention is to provide a guide mechanism for rotary cutting heads wherein the guides are self-cleaning so as to provide a positive positioning surface immediately adjacent to the areas at which the chipping knives are operative on the material being planed.

These and further objects will be evident from the following disclosure, taken together with the accompanying drawings which illustrate a preferred form of the invention. It is to be understood that the peculiar structure of the apparatus as shown, particularly the chipper apparatus, is not intended to limit the scope of the invention, which is concerned with the combination of the novel guide apparatus and the chipping apparatus shown in Patent 3,190,326.

Figure 1:
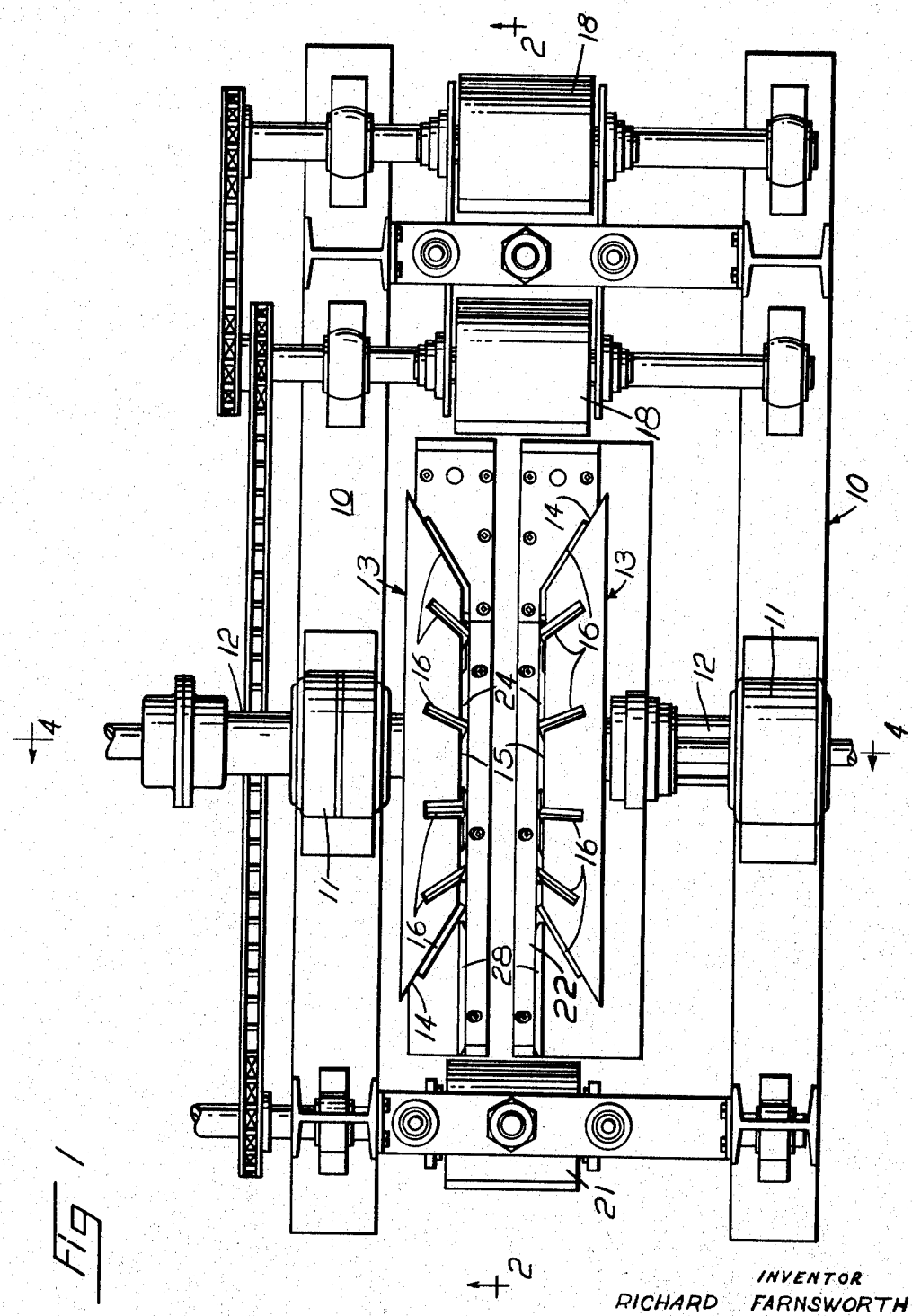
FIGURE 1 is a top view of the chipper apparatus and guide unit for planing the sides of lumber, the infeed side of the apparatus being shown at the right.

In U.S. Patent 3,190,326 there is described a chipper apparatus utilizing a unique rotatable chipping head that incorporates the use of bent knives having leading side cutting edges extending along its conical sides and parallel inner knife surfaces along its circular face. The angular leading edges along the conical section are used to sever the longitudinal grain of the boards contacted thereby and the parallel knife edges along the inner face are used to slice smooth surfaces along the boards. This combined cutting action produces a planed finished surface at each side of the material and yields large usable chips for pulp and paper processes.

The present development is concerned with a guide mechanism for holding the lumber as it is being chipped and planed so as to provide more accurate machining of the final wood surfaces by preventing misalignment of the boards. This involves slight modification of the basic cutter head illustrated in Patent 3,190,326, but no change in the knife relationship relative to the wood material. Therefore, the following disclosure will not be concerned with the details of the knives or the manner in which they are mounted in the cutting heads, the prior patent noted above being a complete disclosure of a suitable example utilizing these features.

The apparatus shown in the drawings is mounted on a fixed supporting framework 10 that includes two side rails. The framework 10 supports bearings 11 for arbor shafts 12 that drive the cutting heads 13. Each cutting head 13 is suitably powered through shaft 12 by a common or separate power driving unit (not shown). They rotate about a common axis on framework 10 at identical speeds to produce the required cutting action on incoming material.

Basically, each cutting head is provided with outwardly directed conical edges 14 and parallel circular inner face surfaces 15. Mounted on the heads 13 are a plurality of knives 16 that include leading edges parallel to and extended outwardly from the conical edges 14 and bent parallel cutting edges that are positioned inwardly from the faces 15. The knife edges along the surfaces 14 sever the longitudinal grain of lumber fed between the heads 13 while the parallel inside knife surfaces cut the chips from the boards and produce smooth planed side surfaces on the emerging lumber.

Figure 2:
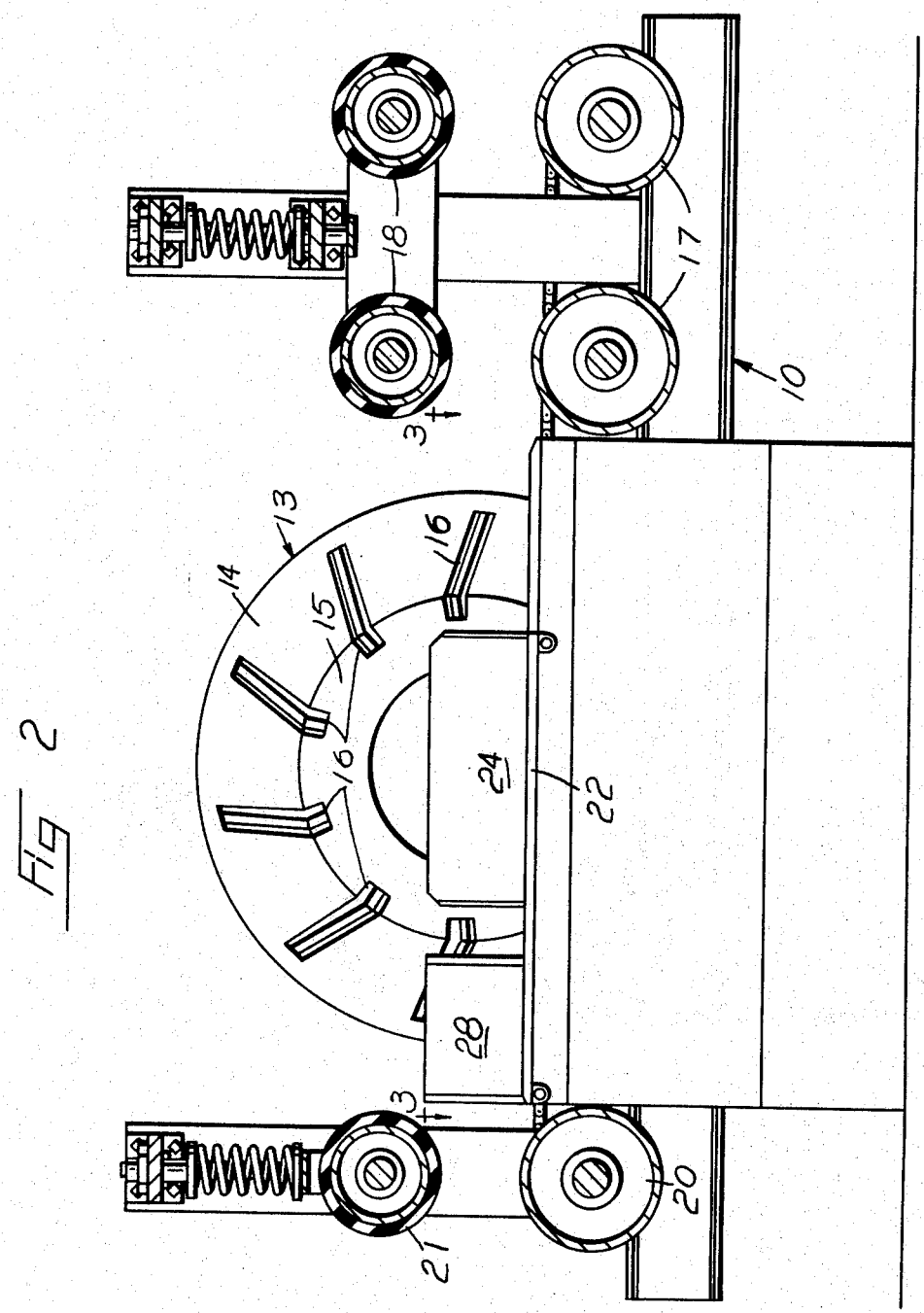
FIGURE 2 is a sectional view taken along line 2—2 in FIGURE 1.

For purposes of illustration there are also shown lower infeed rolls 17 on the framework 10 at the right in FIGURES 1 and 2 and spring-biased upper rolls 18, the rolls 17 and 18 being used to support and vertically guide cants or boards being fed between the rotating heads 13. At the outfeed side of the apparatus there is illustrated a lower roll 20 and a spring biased upper roll 21.

Figure 4:
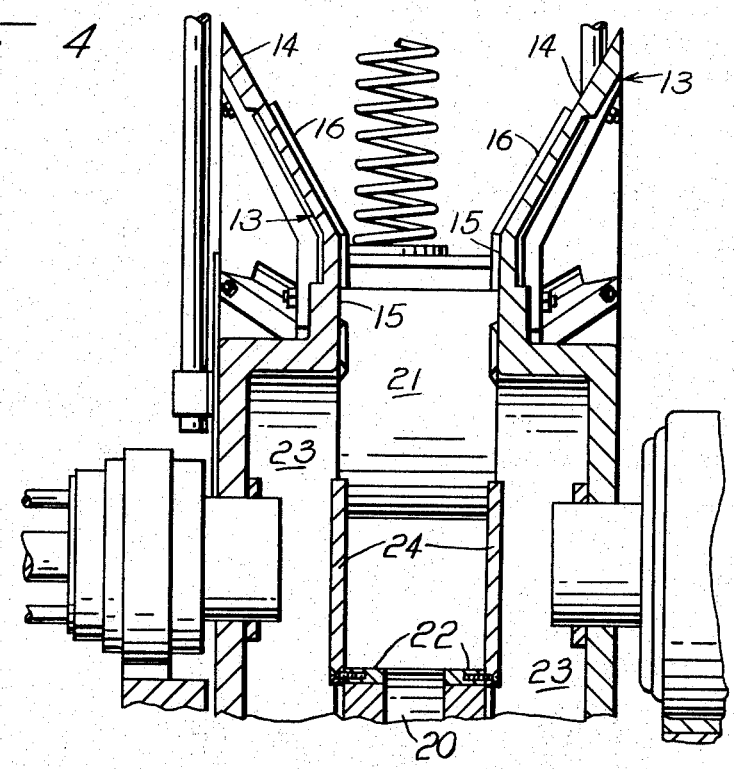
FIGURE 4 is an enlarged fragmentary sectional view taken along line 4—4 in FIGURE 1.

The crucial positioning of boards or cants being planed by the heads 13 occurs in the area between the rolls 17 and 20, as the wood surfaces are being acted upon by the knives 16. It is not sufficient to simply guide the boards or cants at opposite sides of the heads 13, since the bridging distance is such that there is too great a possibility of misalignment of the boards, which is detrimental to the quality of the finished surfaces produced by the knives 16. For this reason, there is shown a pair of longitudinal guide plates 22 mounted on framework 10 for lateral adjustment in conjunction with the respective heads 13 and supported at the lower elevation of boards or cants being fed between heads 13. As seen in FIGURE 4, the upper surfaces of plates 22 are co-planar with the top edges of rollers 17 and 20. The lower board or cant surfaces can therefore be positively supported by the top surfaces of plates 22 as well as by the rollers 17 and 20. The outer transverse edge configuration of each plate 22 is complementary to the adjacent surface configurations of head 13 and knives 16.

Figure 3:
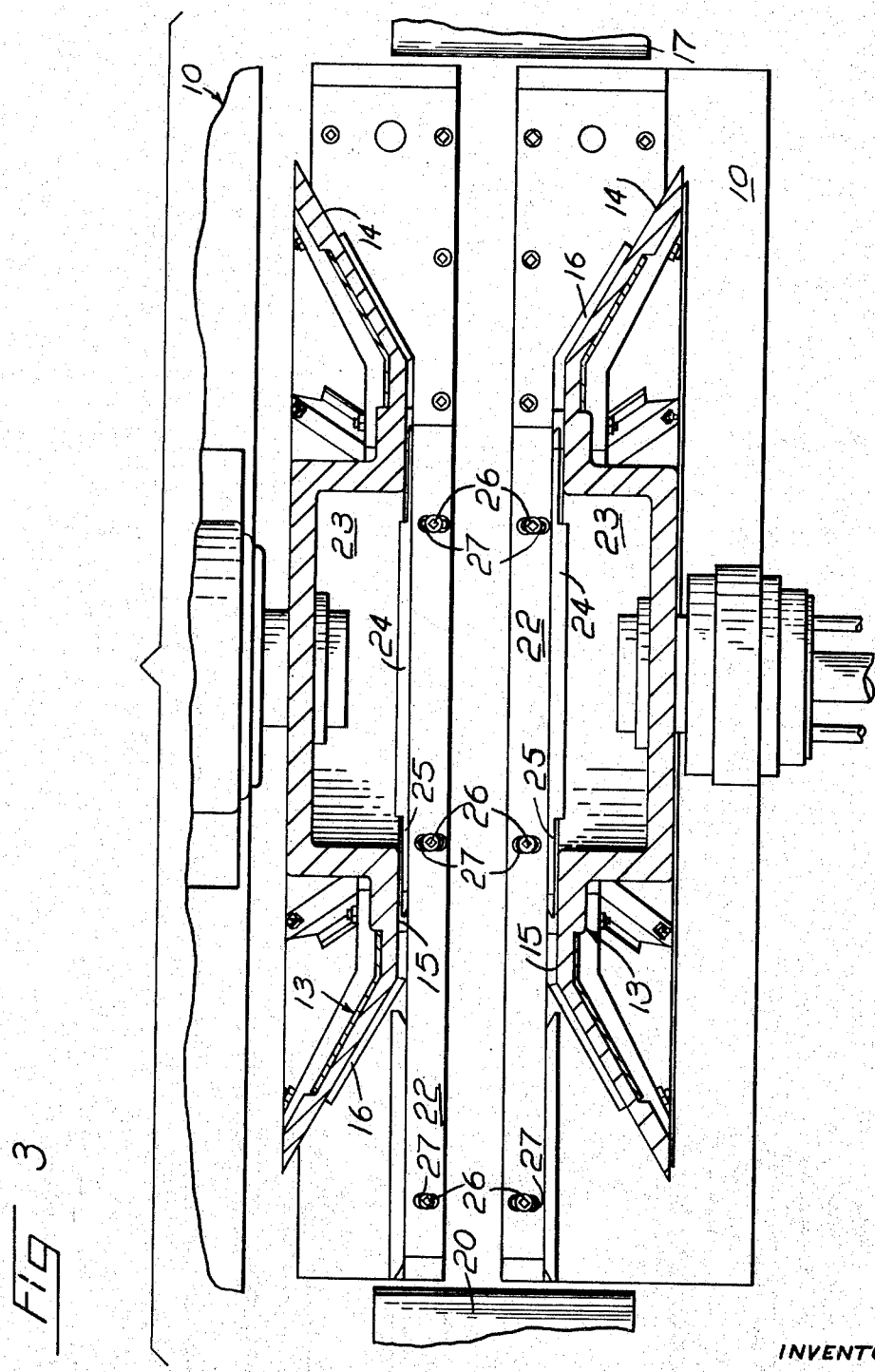
FIGURE 3 is an enlarged sectional view through the chipper apparatus taken along line 3—3 in FIGURE 2.

To provide lateral guidance of the material being fed between heads 13, the heads 13 are centrally recessed as shown at 23 (FIGURES 3 and 4). This recess 23 permits the placement within heads 13 of upright guide plates 24 that extend across the center of each head 13. Plates 24 extend longitudinally substantially across the diametrical spacing between the inner ends of the knives 16. The thickness provided at the longitudinal ends of each plate 24 is narrowed as shown at 25 so as to permit these end sections to be positioned in the transverse area bounded by the projection of knives 16 beyond the inner surfaces 15 of the respective heads 13. The plates 24 are mounted on the longitudinal plates 22 with provision for limited lateral adjustment afforded by adjustable mounting bolts 26 and slots 27.

Also supported by plates 22 are outfeed upright plates 28 that extend rearwardly toward the respective cutting heads 13 as close as practical to the knives 16. The plates 28 have the same height as plates 24 and serve as lateral guides for the sides of the planed materials in the area between the frusto-conical heads 13 and the outfeed rolls 20, 21.

Figure 5:
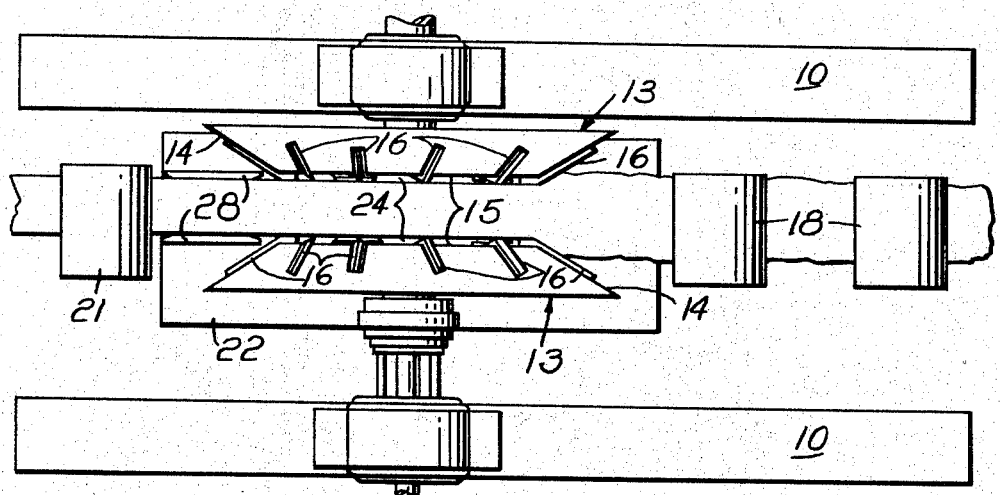
FIGURE 5 is a fragmentary schematic top view similar to FIGURE 1 illustrating the use of the apparatus and guide mechanism.

The guide apparatus described provides positively positioned lateral guide surfaces engageable by the planed board surface immediately as these surfaces emerge from the operational area of the rotating knives 16, the inner surfaces of the plates 24 and 28 cooperating to position the planed board surfaces along the substantial length between the infeed knife cutting area and the outfeed rolls and other conventional guide devices (see FIGURE 5). The upright narrow plates 24, 28 can be positioned much closer to the knives 16 than is possible with rollers or other guide devices. In addition, the plates 28 are rigid and cannot yield or flex when subjected to forces exerted thereon. Yieldable rolls, as contrasted to the fixed plates provided herein, comprise the positioning of the material, since the yieldability detracts from the ability of these rolls to prevent lumber from crowding into the head at one side or the other. The solid fixed plates described above assure a positive positioning action. Furthermore, there is little danger of material engaging between fixed plates and the lumber, since the plates are closely positioned relative to the planed surfaces and are substantially self-cleaning due to the constant rubbing action of the lumber against the plates. In contrast, rolls have the ability to climb over small obstructions such as chips which might adhere to the lumber. A positive positioning surface is necessary in order to insure the maintenance of a smooth, straight cut surface along the respective sides of the lumber.

Various modifications might be made in the particular configuration of the plates and the guide apparatus as shown without deviating from the scope of this disclosure. Furthermore, it is to be understood that the details of the cutting heads as illustrated are not intended to limit the application of the guide apparatus. The cutting heads can be as shown, or might be segmented to mount each particular knife about the periphery of the head. The depth and diameter of the central recess can likewise be varied in a particular application. The important consideration is the provision of fixed transverse guiding plates along the substantial length of the heads from the rear edges of the cutting knives 16 at the infeed side of the heads to the outfeed rolls.

Having thus described my invention, I claim:

1. In a chipper apparatus, in combination with a fixed supporting framework, a pair of spaced coaxial cutting heads rotatably supported by the framework with radially positioned knives mounted thereon and projecting inwardly therefrom:
   first guide plate means on said framework extending longitudinally between the inner faces of the cutting heads, said first guide plate means including a lumber supporting surface lying in a plane parallel to the axis of the cutting heads;
   and perpendicular second guide plate means fixed to said first plate means and extending therefrom outward of the lumber supporting surface thereof, said second plate means having inwardly facing plane surfaces extending substantially across the diametrical spacing of knives across the cutting heads and lying substantially along the inner planes defined by the knives.

2. The combination as defined in claim 1 wherein the lateral edges of said first guide plate means are shaped complementary to the inner surfaces of the cutting heads and knives laterally adjacent thereto during rotation of the cutting heads.

3. The combination as defined in claim 1 wherein the first guide plate means includes at least two plates in side by side positions, said plates being respectively mounted on the framework so as to be transversely adjacent to the respective cutting heads.

4. The combination as defined in claim 1 further comprising:
   third guide plate means fixed to said first guide plate means having inwardly facing surfaces parallel to and aligned with the inwardly facing surfaces of said second guide plate means and extending forwardly in the outfeed directions of lumber passing between the cutting heads, the rear edges of the third guide plate means being adjacent to the forward tangential locus of knives on the respective cutting heads.

5. In a chipper apparatus, the combination of a supporting framework, a pair of opposed coaxial cutting heads rotatably mounted on the framework, each of said cutting heads having mounted thereon a plurality of outwardly projecting cutting knives, each knife having a bent cutting edge with one portion extending along the inner face of the head and one portion extending outwardly from the outer end of the first portion along a conical section relative to the axis of the cutting heads, the inner faces of the heads being radially recessed inward of the knives mounted thereon:
   first guide plate means extending longitudinally between said cutting heads across the inner faces thereof and having an inner surface parallel to the axis of said cutting heads on said framework;
   a pair of parallel central plates carried by said first plate means in transversely spaced location across the respective centers of said heads, the inner spacing between said plates being substantially equal to the minimum spacing across the infeed sides of the knives mounted on said cutting heads.

6. An apparatus as defined in claim 5 wherein said first plate means has a transverse configuration complementary to the rotating cutting head and knife surfaces adjacent thereto.

7. An apparatus as defined in claim 5 wherein said central plates extend substantially across the full width of the area between diametrically aligned knives on said cutting heads.

8. The apparatus as defined in claim 5, further comprising:
   outfeed guide plates fixed to said first plate means extending parallel to said central plates from a location adjacent to the cutting heads at the outfeed end thereof.

References Cited

UNITED STATES PATENTS 3,190,326 6/1965 Standal _____ 144—162
3,327,747 6/1967 Collins _____ 144—162 XR WILLIAM W. DYER, JR., *Primary Examiner.*

W. D. BRAY, *Assistant Examiner.*